June 4, 1968 M. MANES 3,386,999
SYNTHESIS OF MELAMINE
Filed Feb. 10, 1966
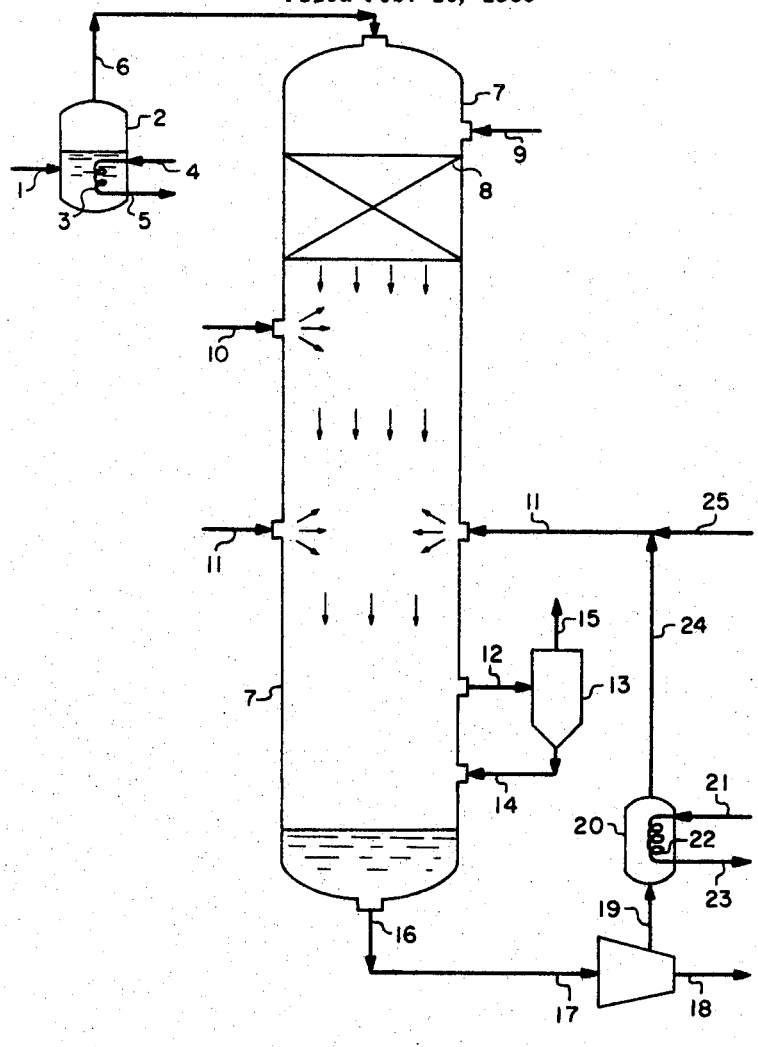
MILTON MANES
INVENTOR.
BY J. T. Chaloty
AGENT 3,386,999
SYNTHESIS OF MELAMINE
Milton Manes, Pittsburgh, Pa., assignor to Chemical Construction Corporation, New York, N.Y., a corporation of Delaware
Filed Feb. 10, 1966, Ser. No. 526,491
9 Claims. (Cl. 260—249.7)

The present invention relates to the synthesis of melamines, by the catalytic conversion of urea. An improved method of synthesis is provided, wherein cyanic acid and other melamine precursors are effectively hydrolyzed to ammonia and carbon dioxide prior to the condensation of solid melamine from the hot gaseous mixture derived from the catalyst bed. The resultant product solid melamine is of high purity and is completely free of urea or by-product compounds, and may be directly utilized in resin manufacture or for other purposes requiring high purity melamine, without re-crystallization or other purification sequences of the prior art.

Melamine is commercially produced from urea by vaporizing molten urea, and passing the resulting urea vapor stream through a catalyst bed at elevated temperature. The urea forms melamine in accordance with the following overall equation:

(1) $6CO(NH_2)_2 \rightarrow C_3N_6H_6 + 3CO_2 + 6NH_3$

The resulting vapor stream is partially condensed by cooling, to yield crude solid melamine and a mixed ammonia-carbon dioxide off-gas. The melamine produced in the prior art by this general procedure is impure and must be purified by re-crystallization or other means to produce a pure product. Impurities which may be present in the vapor stream before condensation consist generally of urea decomposition products and melamine precursors, such as biuret, cyanuric acid, ammelide and ammeline, however a principal vapor phase impurity is cyanic acid. The cyanic acid is formed from urea in accordance with the following equation:

(2) $CO(NH_2)_2 \rightarrow HCNO + NH_3$ and the cyanic acid thus formed also acts as a melamine precursor. In the process description infra, a method for eliminating residual cyanic acid from the vapor stream will be described, however it should be understood that the method is also applicable to the elimination of other melamine precursors, and that the scope of the invention is thus broadly applicable to the elimination of melamine precursors in general from the vapor stream prior to the condensation of pure solid melamine. On cooling the vapor stream, any cyanic acid which may be present reverts to urea in the presence of ammonia. Thus, the crude melamine produced in the prior art procedure generally contained a variety of impurities including urea and melamine precursors.

In the present invention, melamine is catalytically produced from urea vapor by means of a method which achieves the conversion of urea to pure solid melamine free of the various impurities described supra. The intermediate compounds, principally cyanic acid, produced during the catalytic conversion of urea to melamine are completely eliminated from the vapor stream by hydrolysis at elevated temperature before the vapor stream is cooled to condense solid melamine. Urea vapor is passed through a catalyst bed in the conventional manner at elevated temperature, to produce a hot gas mixture containing melamine, ammonia, carbon dioxide and a small amount of cyanic acid. As mentioned supra, the small amount of cyanic acid may actually be present as equivalent melamine precursors, however for the purposes of the present invention, reference to "cyanic acid" is meant to include other melamine precursors as well as cyanic acid. It has now been determined that the cyanic acid present in the hot gas mixture may be effectively eliminated by the addition of a small amount of water vapor to the hot gas mixture, and retention of this added water vapor in the hot gas mixture prior to cooling is such that hydrolysis of the cyanic acid takes place in accordance with the following reaction:

(3) $HCNO + H_2O \rightarrow NH_3 + CO_2$

After hydrolysis of the cyanic acid, the hot gas mixture may be suitably cooled, as by an aqueous quench, to deposit pure solid melamine crystals substantially free of urea and melamine precursors. This sequence is highly advantageous, in that a highly pure solid melamine product is obtained by means of a simple sequence which is readily applicable to existing facilities as well as to new installations. The essence of the invention involves the addition of the water vapor, not to act as a quench, but rather to attain selective high-temperature hydrolysis of the cyanic acid. Thus, the water vapor may be added in the form of a small spray of liquid water, which is almost instantly vaporized into the hot gas mixture without the concomitant deposition of solid melamine. After the rapid hydrolysis of the cyanic acid which subsequently takes place in the vapor phase, the hot gas mixture, now free of cyanic acid and melamine precursors, is cooled in any suitable manner to separate pure solid melamine from the residual off-gas comprising ammonia and carbon dioxide. In cases where an aqueous quench liquid is employed to quench-cool the hot gas mixture, a small proportion of water vapor will also be present in the residual off-gas mixture.

It is an object of the present invention to produce melamine from urea in an improved manner.

Another object is to provide an improved method for the production of pure solid melamine free of urea and melamine precursors.

A further object is to eliminate cyanic acid from the hot gas mixture produced by the vapor phase catalytic conversion of urea to melamine.

An additional object is to provide an improved process for the high temperature vapor phase catalytic conversion of urea vapor to melamine vapor with subsequent condensation of pure solid melamine.

These and other objects and advantages of the present invention will become evident from the description which follows. Referring to the figure, a flowsheet of a preferred embodiment of the present invention is provided. Solid or molten liquid area is passed via 1 into area vaporizer 2. In unit 2, the urea is vaporized in a conventional manner with heating fluid being admitted to coil 3 via 4 and discharged via 5. The vaporized urea stream 6 is withdrawn from unit 2, preferably at a temperature in the range of 340° C. to 425° C. and in any case at a temperature above 320° C. which is the solidification point of melamine. The elevated temperature above 320° C. also prevents the deposition of cyanuric acid. Stream 6 is now passed to catalytic melamine synthesis and gas quench converter 7. An upper temperature limit of 425° C. is generally preferably during catalysis, in order to avoid ammonia loss due to decomposition at more highly elevated temperature. The lower temperature limit of 340° C. is also generally preferable, due to diminished catalytic activity in melamine synthesis at lower temperatures. It will be appreciated, however, that an operating temperature outside these ranges is feasible in practice and could be employed if desired. Due to the heating and vaporization of urea in unit 2, stream 6 will contain urea decomposition products and melamine precursors such as cyanic acid, cyanuric acid, biuret, ammeline and ammelide, as well as ammonia, carbon dioxide and vaporized urea.

The hot gas stream 6 is passed into the upper portion of unit 7, above catalyst bed 8 in which the catalytic conversion of urea and melamine precursors in the hot gas stream 6 to melamine takes place. Bed 8 contains a conventional melamine synthesis catalyst, such as boron phosphate, alumina gel or silica gel. Other known melamine synthesis catalysts may be employed in bed 8. Gas stream 9 consisting of ammonia vapor is preferably also admitted to unit 7 above bed 8, in order to moderate the initial catalytic conversion reaction which rapidly takes place in the upper portion of bed 8. This reaction is exothermic, and the excess ammonia admitted via 9 acts as a diluent and cooling agent to prevent overheating.

The converted gas mixture now passes downwards from bed 8, and contains melamine vapor, ammonia, carbon dioxide, and a small proportion of usually up to about 3% by volume of cyanic acid. The gas mixture is now preferably at a temperature in the range of 340° C. to 425° C., for reasons discussed supra, and in any event must be kept at a temperature of about 320° C., which is the melamine sublimation point, in order to prevent the condensation and deposition of solid melamine on internal surfaces with concomitant decomposition of the melamine to form melams.

A small proportion of water vapor, generally in a range of molar ratio of between 1:1 to 8:1 relative to the cyanic acid content of the gas stream, is now added to the gas stream via stream 10. The water stream 10 may consist of water vapor or steam, however the addition of a liquid water spray which is vaporized in situ is generally preferable, in order to attain more rapid penetration and mixing with the hot gas stream. The water added via stream 10 now reacts with the cyanic acid in accordance with Equation 3 supra, and at the elevated temperature of the gas stream above 320° C. the cyanic acid is completely hydrolyzed to ammonia and carbon dioxide. Thus, the hot gas stream below the entry point of stream 10 is converted to a hot gas mixture consisting solely of melamine vapor, ammonia, carbon dioxide and a small proportion of excess water vapor, and is completely free of cyanic acid and melamine precursors.

The hot gas stream may now be cooled by any suitable means known to the art, to condense pure solid melamine and produce a residual off-gas stream consisting principally of ammonia and carbon dioxide. The cooling of the hot gas stream is preferably a quench-cooling, employing a cold aqueous liquor stream 11 which is preferably at a temperature in the range of 65° C. to 75° C. and preferably contains in the range of 1% to 10% by weight of solid melamine crystals, plus dissolved equilibrium amounts of ammonia, carbon dioxide and melamine. The presence of solid melamine in the aqueous quench liquor stream 11 aids in the subsequent deposition of solid melamine from the gas phase during the quench cooling. Quench liquor stream 11 is projected into the hot gas stream in any suitable manner, to attain a sudden cooling of the gas stream to a lower equilibrium temperature with concomitant deposition of pure solid melamine crystals, however stream 11 is preferably projected into the hot gas stream in the manner disclosed in co-pending U.S. patent application Ser. No. 344,020 filed Feb. 11, 1964, now U.S. Patent No. 3,290,308.

In any case, the resultant gas-liquid mixture obtained from the quench-cooling of the hot gas mixture by stream now passes downward in unit 7, and the mixture separates into a residual gas phase consisting of ammonia-carbon dioxide off-gas which also contains an equilibrium proportion of water vapor, and a liquid slurry consisting of pure solid melamine in warmed aqueous liquor. The liquid slurry collects in the bottom of unit 7, while the off-gas stream 12 passes into entrainment separator 13, which is a gas-liquid separator of conventional design such as a cyclonic-shaped vessel. Entrained liquid is separated from the gas phase in unit 13 and recycled via 14 to unit 7, while the off-gas is removed via 15. Stream 15 contains valuable ammonia values, and is passed to further utilization, such as reaction with nitric acid to form ammonium nitrate. Other utilization of the off-gas such as in the manufacture of urea as described in U.S. patent application No. 264,637 filed Mar. 12, 1963, and now U.S. Patent No. 3,239,522, may also be adopted.

The liquid slurry in the bottom of unit 7 is preferably at a temperature in the range of 75° C. to 90° C., and is withdrawn as liquid slurry stream 16 and processed in a conventional manner to produce pure solid melamine and recycle aqueous quench liquor. Thus, stream 16 is passed to filter or centrifuge unit 17, which is a conventional device for separating slurries into solid and liquid phases. The pure solid melamine product is withdrawn from unit 17 via 18, and passed to product utilization after drying, not shown.

The separated liquid phase is withdrawn from unit 17 via 19, and is recycled for further utilization as aqueous quench liquor. Stream 19 as derived from unit 17 may in some instances contain residual solid melamine crystals, however in most cases stream 19 will be free of solids. In order to provide the desired and preferable solid melamine content of from 1% to 10% solids by weight in the aqueous quench liquor, a portion of stream 16 may by-pass unit 17, not shown, and may be directly added to recycle stream 19. Stream 19 is now cooled in cooler 20 to the preferable quench liquor temperature in the range of 65° C. to 75° C. Cooling water stream 21 is passed through cooling coil 22 in unit 20, and warmed water is withdrawn via 23. The cooled aqueous quench liquor stream 24 is now usually combined with make-up water stream 25, since make-up water is usually required to compensate for the water vapor lost from the system via stream 15. The combined aqueous quench liquor stream 11 is now passed to the quench step as described supra.

Numerous alternatives within the scope of the present invention will readily occur to those skilled in the art. Thus, other quench liquids besides water may be employed in suitable instances, however water per se or an aqueous quench liquor as described supra is the preferred medium. Other means for cooling the hot gas stream besides a liquid quench may be adopted in practice, in order to separate pure solid melamine from the residual off-gas stream. In any case, it is evident that the essence of the present invention does not relate to a quench step per se or the quenching of the hot gas stream, but instead the present invention is directed essentially to the concept of adding a small proportion of water vapor to the hot gas mixture prior to cooling of the gas mixture and separation of solid melamine. It is essential that the gas mixture must remain at a highly elevated temperature above 320° C. after the addition of the water vapor, in order to attain hydrolysis of the cyanic acid in the hot gas mixture.

Other alternatives may be mentioned. Thus, the catalyst bed 8 is shown as a single bed, with injection of ammonia vapor via 9 above the bed to moderate the catalytic reaction. It is alternatively feasible to provide a plurality of smaller catalyst beds in series, with injection of ammonia vapor above each bed. In this manner the catalyst reaction may be more uniformly moderated with maintenance of a uniform temperature level throughout the several catalyst beds.

Finally, heated ammonia gas may be passed into vaporizer 2, to mix with the generated urea vapor thereby aiding in vaporization and providing excess ammonia in the urea vapor stream 6.

An example of an industrial application of the present invention will now be described. In the example infra, all flow quantities are expressed in kilograms per hour.

EXAMPLE

A molten liquid urea feed stream was vaporized at the rate of 790 kilograms per hour, with 583.8 ammonia gas being passed into the vaporizer at 292° C. and 3.5 kg./sq.cm. pressure to combine with the urea vapor thereby aiding in vaporization and providing excess ammonia in the urea vapor stream. The resultant urea-ammonia vapor stream was produced at 400° C. and 2.8 kg./sq.cm., and the urea component was concomitantly partially reacted to form melamine and melamine precursors due to non-catalytic thermal reaction. Thus, the vapor stream passed to the boron phosphate catalyst bed for melamine synthesis contained 807.2 ammonia, 132.2 carbon dioxide, and balance melamine and melamine precursors. In addition, 601.2 ammonia gas at a temperature of 175° C. was sparged into the top of the catalyst bed, to moderate the melamine synthesis reaction. The catalytic reaction was thus maintained essentially isothermal, and a hot gas mixture was produced from the catalyst bed at 400° C. and containing melamine, ammonia, carbon dioxide and about 1.2% by volume of cyanic acid.

A liquid spray of 82.4 water at a temperature of 90° C. was now passed into the hot gas mixture, to attain complete hydrolysis of cyanic acid. The hot gas mixture was concomitantly cooled at 345° C. due to heat absorbed in vaporization of the liquid water spray, and after completion of cyanic acid hydrolysis the hot gas mixture was completely free of cyanic acid and melamine precursors and contined only melamine, ammonia, carbon dioxide and a slight amount of excess water vapor.

This hot gas mixture was now quenched to a temperature of 80° C. at a pressure of 2.1 kg./sq.cm. by contact with a cold aqueous quench liquor which was at an initial temperature before quench of 70° C. The cold aqueous quench liquor contained 8926.5 water, 3550.5 dissolved ammonia, and 2765.0 dissolved carbon dioxide. The aqueous quench liquor also contained a small equilibrium amount of melamine, dissolved in the liquid phase. The gas-liquid mixture derived from the quench step was separated into a mixed off-gas containing 1427.9 ammonia, 314.8 carbon dioxide and 286.7 water vapor, and a liquid slurry containing pure solid melamine at 80° C. and 2.1 kg./sq.cm.

The slurry feed pumped to the product centrifuge contained 8684.5 water, 3550.5 ammonia, 2765.0 carbon dioxide and 253.0 melamine. A wash stream for washing the solid product melamine and consisting of 25.3 water was also passed to the product centrifuge. The solids discharge from the centrifuge consisted of 253.0 pure solid melamine and 5.1 water. This product stream was passed to a dryer to produce dry pure solid melamine, which was directly suitable for usage in resin manufacture without further purification.

The liquid phase derived from the centrifuge at 80° C. consisted of 8704.7 water, 3550.5 ammonia and 2765.0 carbon dioxide. This liquid stream was passed to the aqueous mother liquor hold-up tank, together with 204.7 makeup water to compensate for water loss from the system in the mixed off-gas and product melamine streams. An aqueous quench liquor stream withdrawn from the hold-up tank contained 8926.5 water, 3550.5 ammonia and 2765.0 carbon dioxide. This quench liquor stream was cooled to 70° C. and recycled to the quenching of the hot gas stream.

I claim:

1. In the process of melamine synthesis from urea wherein vaporized urea is catalytically converted at a temperature above 320° C. to form a gaseous mixture principally consisting of melamine, ammonia, carbon dioxide and a minor proportion of cyanic acid, said gaseous mixture is cooled to condense solid melamine from the residual gas phase, and residual mixed off-gas comprising ammonia and carbon dioxide is separated from the product solid melamine, the method of eliminating cyanic acid from said gaseous mixture and thereby producing pure melamine free of urea, urea decomposition products, and melamine precursors which comprises adding a small proportion of water vapor to said gaseous mixture prior to said cooling of the gaseous mixture to condense solid melamine, whereby said cyanic acid is hydrolyzed in said gaseous mixture at an elevated temperature above 320° C. to form ammonia and carbon dioxide, and thereafter cooling said gaseous mixture, whereby said product melamine is condensed as pure solid melamine substantially free of urea and melamine precursors.

2. The method of claim 1, in which said water vapor is added to said gaseous mixture for cyanic acid hydrolysis in a molar ratio in the range of 1:1 to 8:1 relative to the cyanic acid content of said gaseous mixture.

3. The method of claim 1, in which said water vapor is added to said gaseous mixture for cyanic acid hydrolysis in the form of a liquid water spray, said liquid water spray being completely vaporized into said gaseous mixture.

4. In the process of melamine synthesis from urea wherein vaporized urea is catalytically converted at a temperature above 320° C. to form a gaseous mixture principally consisting of melamine, ammonia, carbon dioxide and a minor proportion of cyanic acid, said gaseous mixture is quench-cooled by contact with a cold aqueous liquor stream whereby solid melamine is condensed from the gas phase, residual mixed off-gas comprising ammonia and carbon dioxide is separated from the liquid slurry comprising solid melamine in warmed aqueous liquor, said liquid slurry is separated into product solid melamine and warmed aqueous liquor, and said warmed aqueous liquor is cooled and recycled to said contact with said gaseous mixture, the method of eliminating cyanic acid from said gaseous mixture and thereby producing pure melamine free of urea, urea decomposition products, and melamine precursors which comprises adding a small proportion of water vapor to said gaseous mixture prior to said quench-cooling of the gaseous mixture by contact of the gaseous mixture with a cold aqueous liquor stream, whereby said cyanic acid is hydrolyzed in said gaseous mixture at an elevated temperature above 320° C. to form ammonia and carbon dioxide, and thereafter quench-cooling said gaseous mixture by said contact with a cold aqueous liquor stream, whereby said melamine is condensed into said cold aqueous liquor stream as pure solid melamine substantially free of urea and melamine precursors.

5. The method of claim 4, in which said water vapor is added to said gaseous mixture for cyanic acid hydrolysis in a molar ratio in the range of 1:1 to 8:1 relative to the cyanic acid content of said gaseous mixture.

6. The method of claim 4, in which said gaseous mixture is at a temperature in the range of 340° C. to 425° C. prior to contact with said cold aqueous liquor stream.

7. The method of claim 4, in which said water vapor is added to said gaseous mixture for cyanic acid hydrolysis in the form of a liquid water spray, said liquid water spray being completely vaporized into said gaseous mixture.

8. The method of claim 4, in which said cold aqueous liquor stream initially contains from 1% to 10% by weight of solid melamine crystals, prior to contact with said gaseous mixture.

9. The method of claim 4, in which said cold aqueous liquor stream is at a temperature in the range of 65° C. to 75° C. prior to contact with said gaseous mixture.

References Cited

UNITED STATES PATENTS

| | | | |
|---|---|---|---|
| 2,566,225 | 8/1951 | Mackay et al. | 260—249.7 |
| 2,566,231 | 8/1951 | Paden et al. | 260—249.7 |
| 3,310,558 | 3/1963 | Oele et al. | 260—249.7 |

OTHER REFERENCES

Tiselius et al. (Ed.): "The Svedberg," Almqvist & Wiksells, Pub., Uppsala, Sweden (1945), pp. 344–51.

JOHN D. RANDOLPH, *Primary Examiner.*

J. M. FORD, *Assistant Examiner.*